(12) United States Patent
Shpiro

(10) Patent No.: US 10,345,880 B2
(45) Date of Patent: Jul. 9, 2019

(54) CONTROLLED POWER ADAPTER

(71) Applicant: ADVANCED MAGNETIC SOLUTIONS LIMITED, Wanchai (HK)

(72) Inventor: Zeev Shpiro, Tel-Aviv (IL)

(73) Assignee: ADVANCED MAGNETIC SOLUTIONS LIMITED, Wanchai (HK)

( * ) Notice: Subject to any disclaimer, the term of this patent is extended or adjusted under 35 U.S.C. 154(b) by 0 days.

(21) Appl. No.: 16/110,040

(22) Filed: Aug. 23, 2018

(65) Prior Publication Data

US 2018/0364779 A1     Dec. 20, 2018

Related U.S. Application Data

(63) Continuation-in-part of application No. 15/328,279, filed as application No. PCT/IL2015/050755 on Jul. 22, 2015.

(60) Provisional application No. 62/027,270, filed on Jul. 22, 2014.

(51) Int. Cl.
  *G06F 1/26* (2006.01)
  *H02J 7/00* (2006.01)
  *G06F 13/40* (2006.01)

(52) U.S. Cl.
  CPC ............ *G06F 1/266* (2013.01); *G06F 13/409* (2013.01); *H02J 7/0042* (2013.01); *H02J 7/0055* (2013.01); *H02J 2007/0062* (2013.01)

(58) Field of Classification Search
  None
  See application file for complete search history.

(56) References Cited

U.S. PATENT DOCUMENTS 6,541,879 B1 *  4/2003  Wright ............... H02J 1/102
                                                    307/31
2003/0172312 A1   9/2003  Takahashi et al.
2007/0230227 A1  10/2007  Palmer
2008/0319313 A1  12/2008  Farrar et al.
2010/0280676 A1  11/2010  Pabon et al.
2011/0239008 A1   9/2011  Lam et al.
2012/0064772 A1   3/2012  Pocrass
2012/0071215 A1   3/2012  Bourque
2012/0081067 A1   4/2012  Burrell, IV
                          (Continued)

FOREIGN PATENT DOCUMENTS

CN    201247888 Y    5/2009
CN    203260868 U   10/2013
              (Continued)

*Primary Examiner* — Jared Fureman
*Assistant Examiner* — Joel Barnett
(74) *Attorney, Agent, or Firm* — Browdy and Neimark, PLLC

(57) ABSTRACT

A power adapter hub is provided, comprising: an AC input port; a power supply circuit coupled to the AC input port for receiving AC power and having a maximum rated output power; and a plurality of output ports coupled to the power supply circuit for supplying DC power to external devices. Upon determining that the total power to be supplied might exceed the maximum rated output power, a DC power supplied through at least one of the output ports is modified, and the modified DC powers are set to ensure that the supplied power does not exceed the maximum rated output power.

14 Claims, 2 Drawing Sheets

(56) References Cited

U.S. PATENT DOCUMENTS

| | | | |
|---|---|---|---|
| 2013/0013936 A1* | 1/2013 | Lin | G06F 1/266 713/300 |
| 2013/0132758 A1 | 5/2013 | Shiba | |
| 2014/0125131 A1* | 5/2014 | Lalitnuntikul | G06F 1/266 307/31 |
| 2014/0129856 A1* | 5/2014 | Bertin | G06F 1/266 713/320 |
| 2014/0239886 A1 | 8/2014 | Lalitnuntikul et al. | |
| 2015/0115897 A1 | 4/2015 | Hsu et al. | |
| 2015/0121095 A1* | 4/2015 | Tsai | G06F 1/266 713/310 |
| 2015/0331826 A1* | 11/2015 | Ghosh | G06F 13/4022 710/313 |

FOREIGN PATENT DOCUMENTS

| | | |
|---|---|---|
| JP | 2003263245 A | 9/2003 |
| JP | 2008182858 A | 8/2008 |
| WO | 2005022369 A1 | 3/2005 |

* cited by examiner

CONTROLLED POWER ADAPTER

FIELD OF THE INVENTION

The present invention relates generally to power supplies, and more particularly, to methods and systems for connecting between output ports and input port of a power adapter.

BACKGROUND OF THE INVENTION

Advanced electronic devices are typically connected to power supplies having smart output ports. However, when multiple output ports power supplies are being used, there is a need, which has not been satisfied by the solutions known in the art, to efficiently utilize these ports.

Furthermore, there is a need in the art to optimally prevent situations of overload that might occur in power adapter hubs, so as to minimize adverse effects on electronic devices connected thereto.

SUMMARY OF THE INVENTION

The disclosure may be summarized by referring to the appended claims.

It is an object of the present disclosure to provide a controlled power adapter hub adapted to efficiently provisioning of power to electronic devices connected thereto.

Other objects of the present disclosure will become apparent from the following description.

According to a first aspect of the present invention, there is provided a power adapter hub comprising: an AC input port; a power supply circuit coupled to the AC input port for receiving AC power from a power source and having a maximum rated output power; and a plurality of output ports coupled to the power supply circuit for supplying DC power therethrough to external devices, wherein the power supply circuit is configured, upon determining that the total power that is about to be supplied through the plurality of output ports might exceed the maximum rated output power, to modify the DC power supplied through at least one of the plurality of output ports, wherein the modified DC power (in other words, the reduced DC power with respect to the maximum DC power that can be provided via the output port) is specific to each respective output port, and wherein the modified DC power is within a range extending between zero (i.e. including zero) and maximum (i e including the maximum) power delivery capabilities of the output port, and wherein the modified DC power of at least one of the plurality of output ports is greater than zero and less than maximum power delivery capabilities of the output port, thereby enabling supply of DC power to an external device when connected to the at least one of the output ports, and wherein the values of the modified DC powers associated with corresponding output ports, are set to ensure that the power adapter hub supplies power that does not exceed its maximum rated output power.

As will be appreciated by those skilled in the art, the term "maximum rated output power" used herein throughout the specification and claims, is used to denote characterization of a power supply. Yet, it should be clear that this term relates directly to the term "maximum rated input power" and as the two terms are related to each other, they may be used interchangeably (e.g. in a simple power supply scenario such a relationship is defined by: Input Power=Output Power/Efficiency).

As will be appreciated by those skilled in the art, the term "power is about to be supplied" or any variation thereof, should be understood to encompass power that will be provided within a time period that extends between very near future and far future.

Furthermore, as will be appreciated by those skilled in the art, when reference is made to DC power associated with an output port, or DC powers associated the plurality of output ports, or any variation thereof, it should be understood to include that when the various DC power levels are taken together, irrespective of whether a certain level from among the various DC power levels has been changed or not, they form a group of DC power levels (one per each DC output port) having a total DC deliverable power that is in conformity with the power delivery capabilities of the power adapter hub.

According to another embodiment the power supply circuit is further configured and operable to affect the DC power modification, although no DC power provided via each of the plurality of output ports, has exceeded its own maximum power delivery capabilities. Preferably, the DC power modification is affected upon determining that the total power that is about to be supplied through the plurality of output ports might exceed the maximum rated output power of the power adapter hub.

In accordance with another embodiment of this aspect of the disclosure, there is provided a power adapter hub comprising: an AC input port; a power supply circuit coupled to the AC input port for receiving AC power from a power source and having a maximum rated output power; and a plurality of output ports coupled to the power supply circuit for supplying DC power therethrough to external devices, wherein the power supply circuit is configured, upon determining that the total power that is about to be supplied through the plurality of output ports might exceed the maximum rated output power, to modify the DC power supplied through one or more of the plurality of output ports, where the modified DC power is specific to each respective output port, wherein the modified DC power is within a range extending between zero (i.e. including zero) and maximum (i.e. including the maximum) power delivery capabilities of the respective output port, wherein the modification of the DC power of at least one of the plurality of output ports is based on susceptibility to reduced DC power of an external device connected to an output port of the plurality of output ports, and wherein the values of the modified (reduced) DC powers, are set to ensure that the power supplied by the adapter hub does not exceed its maximum rated output power.

The term "susceptibility" as used herein throughout the specification and claims of an external device to a reduced DC power, should be understood as the ability of the external device to operate at a power level that is lower than:
  a) maximum power delivery capabilities of the output port to which the external device is connected, or
  b) power currently being delivered to the external device, or
  c) power being requested by the external device.

As will be appreciated by those skilled in the art, operating the external device at a reduced DC power level being lower than requested or currently delivered or can be provided by the output port, enables diverting the non-consumed DC power to one or more other output port(s) and/or external device(s), (e.g. which can benefit from this additional amount of DC power that may be delivered thereto).

According to another embodiment of this aspect of the disclosure, the information that relates to susceptibility to reduced DC power of the at least one external device, is derived from information exchanged between the external device and an output port to which the external device is connected.

Optionally, the information required to determine susceptibility of the external device to reduced DC power may also be retrieved from tracing/following power delivery to that external device over time. For example, if the connected device includes a rechargeable battery, and when connecting that external device its battery is only partially charged, the charging power will decline over time (in parallel to the charging of the battery). When such a device is identified, the power delivered to it can preferably be partially reduced, so that the battery would still be charged but at a slower rate. In such a case, preferably, the amount of power being taken off from the power initially delivered to such a device, can be allocated (e.g. diverted) to other connected devices that need power to be delivered to them or need additional power to be delivered to them.

Let us assume in another example that the external device that is connected to an output port of the power adapter hub has consumed 40 W for some time, whereas the maximum power delivery capability of the respective channel is 60 W. Upon identifying such a scenario, a reduced DC power level is preferably set to a lower value than maximum power delivery capability of that channel, for example to 44 W (i.e. the delivered power plus 10% "safety margin"). The difference in the power allocated to this channel (16 W in this case) may be diverted to be used by other output ports for the benefit of external devices either connected or that will be connected, thereto.

By yet another embodiment, the power supply circuit includes at least one processor configured and operable to calculate instantaneous power delivered via the output ports currently connected to external devices, and to determine the modified DC power of at least one output port.

As will be appreciated by those skilled in the art, the control (including, for example, calculation of the delivered power and the determination of the DC power modification) can be implemented by using a single processor or multi-processors (distributed architecture).

According to still another embodiment, the modified DC power of at least one of the plurality of output ports, is less than the power currently being delivered through that at least one output port.

According to another embodiment, no external device is connected to the at least one of the plurality of output ports to which the modified DC power is set to be greater than zero and less than maximum power delivery capabilities of the output port.

In accordance with still another embodiment, the values of the modified DC powers are set to ensure that when an external device is connected to an unused output port, the power adapter hub delivers power without exceeding its maximum rated output power.

It should be noted that the change (modification) of the DC power supplied to at least one of the plurality of output ports, does not necessarily have to be the same as the change of the DC power supplied to another output port of the plurality of output ports. For example, there could be a reduction of the DC power implemented at one output port that is twice as much as the reduction of the DC power implemented for another output port.

It should also be noted that the DC power modification can be implemented in wither a single step or in multiple steps, and in latter case of multiple steps, different steps may be carried out either immediately one after the other or at different times.

According to another embodiment, at least one of the plurality of output ports is a smart output port, and wherein the maximum power being delivered through the smart output port may be modified during operation.

As will be appreciated by those skilled in the art the term "smart output port" of a power supply should be understood to encompass an output port that is adapted to communicate (e.g. with a load (such as a device connected thereto), and/or with a controller) and/or is adapted to change its own power characteristics. In addition, a smart output port is optionally configured to change its own power characteristics as a result of a request communicated to/via that smart output port.

By yet another embodiment, each of the modified DC powers is set to a value greater than zero.

In accordance with another embodiment, the power adapter hub further comprising at least one current sensing unit located along at least one of a plurality of DC power paths extending between the output port connector and the power source.

According to still another embodiment, the setting of the modified DC power is implemented by affecting the DC current without substantially affecting the DC voltage of the DC power being provided via at least one of the plurality of output ports.

By yet another embodiment, at least one (and optionally all) of the plurality of output ports is a USB Type C port supporting power delivery.

According to another embodiment, at least one of the plurality of output ports comprising a smart interface, and wherein the smart interface of said at least one of the plurality of output ports complies with one or more characteristics being members of a group that consists of: Universal Serial Bus (USB) Power Delivery (PD), USB 3.x, USB-C, Quick Charge (QC) and Battery Charging (BC).

In accordance with another embodiment, in a case where modified DC power of at least one output port from among the plurality of output ports is less than the output port maximum power delivery capabilities, the power adapter hub is further configured and operable to provide an indication regarding the reduced DC power capabilities. The indication may comprise information as to at least one type of an external device that is operable upon being connected to that output port.

It should be understood that in accordance with the present invention, the above indication:

1. may be generated for both unused as well as for used output ports; and/or
2. may be provided for output ports already at their maximum power delivery capabilities.

According to another aspect of the disclosure there is provided a power adapter hub comprising: a power input port; a power supply circuit coupled to the power input port for receiving input power and having a maximum rated output power; a controller; and a plurality of output ports coupled to the power supply circuit for supplying DC power therethrough to external devices, wherein at least one of the plurality output ports is characterized by:
 a) its maximum power delivery capabilities,
 b) its allocated power, being a varying maximal amount of power set by the controller for the at least one output port that is allowed to be delivered via the respective at least one output port, and
 c) its delivered power being power that is actually being delivered via the respective at least one output port, wherein the power supply circuit is configured, upon realizing (determining) that the total power that is about to be supplied through the plurality of output ports might exceed the maximum rated output power, to modify the allocated power of at least one of the plurality of output ports to a level higher than zero and lower than that port maximum power delivery capabilities, thereby enabling power delivery through the at least one output port to an external device when connected thereto, and wherein values of the allocated powers are set to ensure that the power adapter hub supplies power without exceeding its maximum rated output power.

The allocated power of an output port preferably extends between zero (i.e. including zero) and the output port's maximum (i.e. including the maximum) power delivery capabilities.

The power source connected to the power input port is either an AC power source or a DC power source.

According to another embodiment of this aspect, allocated power of at least one output port is set to zero, in spite that the at least one output port has not exceeded its maximum power delivery capabilities.

By yet another embodiment, once a further external device is connected to an unused output port of the power adapter hub, power that is being delivered to the further external device will not cause the power adapter hub to exceed its maximum rated output power.

The term "a further external device is connected" should be understood to encompass both cases where a) that further external device is the first external device being connected to the power adapter hub (i.e. where at the time when that further external device is connected, none of the output ports of the power adapter hub is used); and b) at the time when the further external device is connected to the power adapter hub, at least one other external device has already been connected to a respective at least one output port of the power adapter hub.

In accordance with still another embodiment, the sum of the plurality of output ports maximum power delivery capabilities, is greater than the maximum rated output power of the power adapter hub.

According to yet another aspect of the present disclosure, there is provided a power adapter hub comprising: an AC input port; a power supply circuit coupled to the AC input port for receiving AC power from a power source and having a maximum rated output power; and a plurality of output ports coupled to the power supply circuit for supplying DC power therethrough to external devices, wherein the power supply circuit is configured, upon determining that the total power that is about to be supplied through the plurality of output ports might exceed the maximum rated output power of the power adapter hub, to modify DC power to be supplied through at least one of the plurality of output ports although none of the plurality of output ports has exceeded its own maximum power delivery capabilities, wherein the modified DC power is specific to each respective output port, wherein the modified DC power is within a range extending between zero (including zero) up to maximum (including the maximum) power delivery capabilities of the output port, wherein the modified DC power of at least one of the plurality of output ports is less than maximum power delivery capabilities of that output port, and wherein the values of the modified DC powers associated with respective output ports, are set to ensure that the power adapter hub supplies power that does not exceed its maximum rated output power.

According to another aspect of the present disclosure there is provided a method for controlling DC power supplied by a power adapter hub comprising: an AC or a DC input port; a power supply circuit coupled to the AC or DC input port for receiving power from a power source and wherein the power adapter hub has a maximum rated output power; and a plurality of output ports coupled to the power supply circuit for supplying DC power therethrough to external devices, the method comprising the steps of:

supplying DC power to any external device connected to a respective output port from among the plurality of output ports, wherein the DC power supplied via all of the output ports connected to external devices, does not exceed the maximum rated output power of the power adapter hub, and upon determining that the total power that is about to be supplied through the plurality of output ports might exceed the maximum rated output power of the power adapter hub, modifying the DC power supplied through at least one of the plurality of output ports, wherein the DC power modification is specific to each respective output port, and wherein the modified DC power is within a range extending between zero (i.e. including zero) and maximum (i.e. including the maximum) power delivery capabilities of that output port, and wherein the modified DC power of at least one of the plurality of output ports is greater than zero and less than maximum power delivery capabilities of that output port, thereby enabling supply of DC power to an external device when connected to the at least one of the output ports, and wherein the values of the modified DC powers associated with respective output ports, are set to ensure that the power adapter hub supplied power does not exceed its maximum rated output power.

These and other features and benefits of the invention disclosed herein will be more fully understood upon consideration of the following description and the accompanying drawings.

DETAILED DESCRIPTION OF EMBODIMENTS

Embodiments of the present invention provide improved methods and systems for powering electronic devices by smart DC power sources. The embodiments described hereinafter comprise power adapter hubs and a system combining both a hub and smart cables, construed in accordance with an embodiment of the present invention.

In a typical AC/DC power supply, the power supply is characterized by its input voltage range, and its output power and voltage. Alternatively, it may be characterized by its output voltage and current (power=voltage*current). For example, an AC/DC 10 W, 5V power supply, is equivalent to saying that the power supply delivers a voltage of 5V and current of 2 A. This implies that the power supply:

output power of 0-10 W (10 W being its maximum power delivery capability);

delivers 5V and 0-2 A (when the current is at its maximal value, i.e. equal to 2 A, the output power is equivalent to 10

W, or in other words, the latter conditions are the maximum current/power delivery capabilities).

Many times power supplies terminology refers to the maximum power/current delivery capabilities without mentioning the word maximum and/or capabilities and/or referring to the actual delivered power/current. Although the disclosure provided herein refers mainly to CV (constant voltage) power supplies, still, it should be understood to be applicable to other types of power supplies, for example to CC (Constant Current) power supplies.

Figure 1:
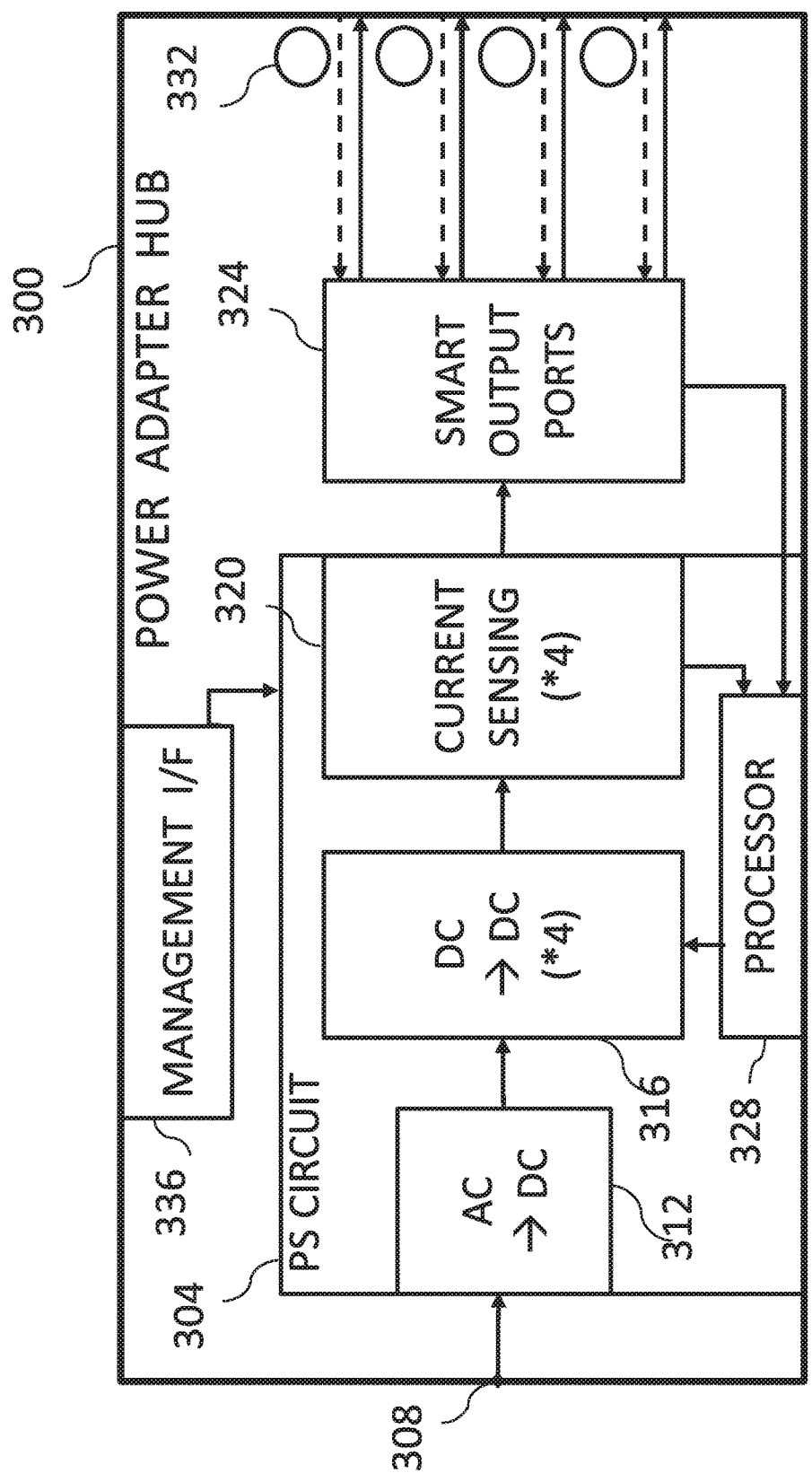
FIG. 1 is a block diagrams that schematically illustrates a power adapter hub, construed in accordance with an embodiment of the present invention.

FIG. 1 shows a block diagram that illustrates schematically a power adapter hub 300, construed in accordance with an embodiment of the present invention. A power path through power adapter hub 300 starts with an AC input port 308. An AC to DC converter 312 produces a stabilized (regulated) DC voltage that feeds multiple DC to DC converters 316.

As known in the art, stabilized DC voltage can also be directly retrieved from an external DC power source or from a DC source having a different power level, where in this latter case, the input DC power level is converted to the required stabilized DC voltage level by using a DC/DC converter instead of the AC/DC converter 312 depicted in FIG. 1. Alternatively, the conversion range of each of the DC/DC converters illustrated in block 316 may be extended (if required), to support the new DC power input level. In addition, it is known that the input to the DC/DC converter 316 can also be a non-stabilized DC power, in which case the stabilization (regulation) is achieved by the DC/DC converter 316. All power sources, as the AC source taken together with AC/DC converter 312, or using a DC source directly connected to converter 316, or DC source connected to converter 316 via a DC/DC converter, can deliver such a non-stabilized DC power. In an alternative implementation, multiple AC/DC converters are used, one for each channel (4, in the case illustrated in FIG. 1). In such a case, the multiple AC/DC converters replace blocks 312 and 316. In this case, preferably part of the primary circuit for each of the AC/DC converter can be implemented only once and shared among the multiple AC/DC converters. The above describes some implementations out of many possible ones.

The DC output power of converters 316 are conveyed via current sensing units 320 and smart output ports 324. A processor, 328, is connected to sensing units 320 and output ports 324 for continuously calculating the overall power consumed by external devices (not shown in this Fig.) that are connected to and powered by output ports 324.

In addition, it should be noted that current sensing devices can alternatively be located at different places along the DC power channel/path, for example in block 316, before the DC/DC converter of the power channel, or between smart output ports 324 and output connectors. In addition, the functionality carried out by the processor can also be implemented by a distributed architecture comprising a plurality of processors, for example by the processors controlling each smart output port.

Moreover, processor 328 is configured to calculate the power delivered through each of the channels, and/or alternatively the power delivered through channels to which external loads are connected (i.e. used output ports). Preferably, the processor is configured to sum the power of the channels in order to calculate the overall delivered power. These calculations can preferably be done on a continuous basis and/or at certain pre-defined time periods, and/or upon occurrence of a trigging event.

The above stages 312, 316, 320 and 328 comprise a power supply circuit 304 (PS) for which a maximum, rated output power is specified.

The term "output port" as used herein, should be understood to encompass a broader scope than that of block 324 illustrated in FIG. 1, and should be understood to encompass also the DC power path (power channel), including blocks 316, 320 and 324, that extends till the output port connector.

In addition, it should be understood that smart output ports designated 324 in FIG. 1, may be included in above power supply circuit 304, as well as other elements of the device, all without departing from the scope of the invention.

Processor 328 is preferably made aware of the properties of the external devices, based on power request information exchanged through smart output ports 324. Based on these properties and optionally additional available information such as for example maximum power delivery capabilities of the output port to which the external is connected, processor 328 infers the susceptibility of each external device to a possible reduced DC power supplied thereto.

The power request information conveyed from the external devices to the Smart output ports 324, are conveyed via the lines illustrated in FIG. 1 as dotted lines. The dotted lines illustrated in FIG. 1 are schematic lines and may preferably be implemented as part of the respective power lines, or as separate communication (and/or data) lines (wired or wireless), or as a combination thereof.

As may be understood from the above, the processor may be configured to calculate power, either for the channels and/or the overall power, where power comprises delivered power and/or requested power and/or a combination thereof.

When processor 328 determines, based on the overall consumed power and/or requested power and/or power delivery capabilities of the output ports, that the maximum rated output power tends to (or is likely to) be exceeded, it concludes that the power supply is about to reach an "overload" condition (situation) and therefor initiates controlling actions in order to mitigate the overload as explained hereinafter. A management interface 336 may be used (as in the present example) for remotely monitoring and control power adapter hub 300. In various embodiments of the present invention, smart output ports 324 may comprise one or more features relating to various specifications such as USB Power Delivery (PD), USB 3.x, USB-C, Quick Charge (QC) and Battery Charging (BC).

Figure 2:
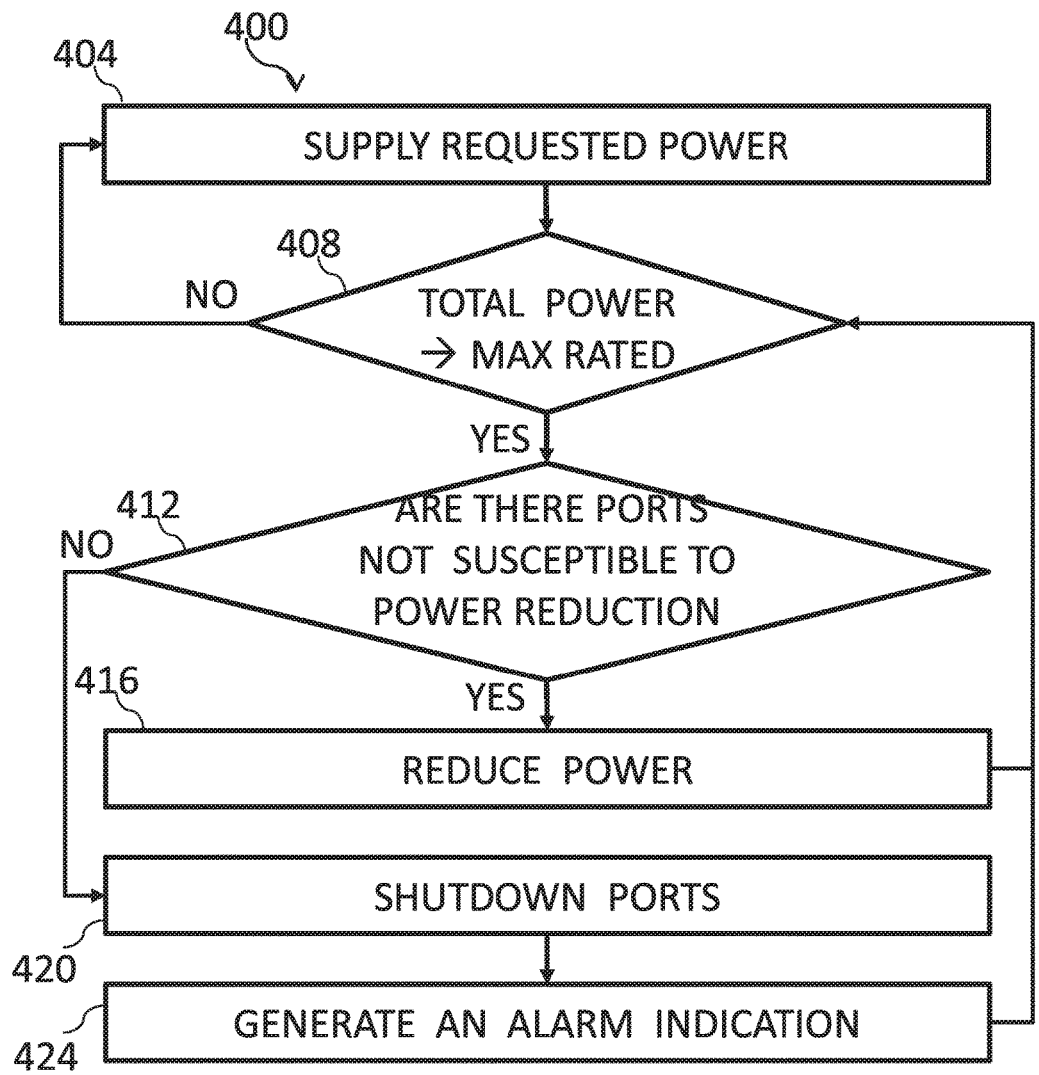
FIG. 2 is a flowchart that schematically illustrates a method for controlling DC power supplied by a power adapter hub, construed in accordance with an embodiment of the present invention.

FIG. 2 shows a flowchart 400 that schematically illustrates a method for controlling DC power supplied by power adapter hub 300, in accordance with an embodiment construed in accordance with the present invention. The method begins with a supplying step 404, wherein output ports 324 supply output power to the external devices, following their requests and according to their requirements. Typically, these requests are forwarded towards power hub 300, by using power transfer protocols comprised in the above-mentioned smart output port specifications. In decision step 408, processor 328 continuously checks whether PS 304 is (or is about to be) overloaded, upon provisioning of the requested power. In the case that an overload condition is likely to occur following the provisioning of the requested power, the method exemplified herein proceeds to a decision step, 412, wherein processor 328 instructs DC to DC converters 316 (or smart output port 324) to set a reduced power that will be supplied to the external devices according to a predefined priority-based policy that takes into account the assessed susceptibility of the currently connected external devices, to a power reduction.

The predefined priority-based policy referred to hereinabove, may preferably address also power allocation to unused output ports. Also, the processor may take into consideration when making its determination, the maximum power delivery capabilities of the different channels, and in addition it may choose how to implement the power reduction decision, as this decision may typically be implemented in any one of a number of ways, depending on from which of the output port will the power supply be reduced and at which amount.

In an example of this embodiment of the present disclosure, the priority-based policy starts, in a power reduction step, 416, whereby the power supplied to output ports that supply power to external devices such as chargers, is reduced, due to their low susceptibility to temporal power reduction. Once no external devices that are substantially not susceptible to power reduction are left, the policy, a shutdown step 420, is affected, in order to successively shut down output ports according to a predefined priority. The method exemplified in this Fig., terminates with step 424 by which processor 328 issues an alarm indication through indicators 332 for each shut down output port. In some embodiments, some DC to DC converters 316 are configured and operable to reduce the supplied power by reducing the supplied current without substantially affecting the corresponding output port voltage.

As will be appreciated by those skilled in the art, the above described case is one example demonstrating the present invention, where the priority-based policy is implemented for preventing the power adapter hub from reaching an overload situation, and wherein external devices are connected to all of the output ports. Yet, it should be noted that the present invention is not limited to the above-described priority-based policy, and different policies may be implemented in order to deal with this problem.

Furthermore, the present should be understood to cover cases and their respective polices, where some or none of the hub's ports are used, (i.e. no external device is connected to such a port). In such cases, the policies are configured to change the power being allocated to at least one of the used or the unused ports (even though no load has yet been connected to them), in order to prevent overload scenarios (preferably when loads are being connected to the unused ports, and in particularly, when the following load is connected).

According to an embodiment of the disclosure, an indication is provided when an output port is shut down and/or when reduced power is being supplied to an output port. An alarm can be used as such an indication. Optionally, this indication may include information regarding the type of devices that can be connected to the port and be operable thereby.

Figure 3:
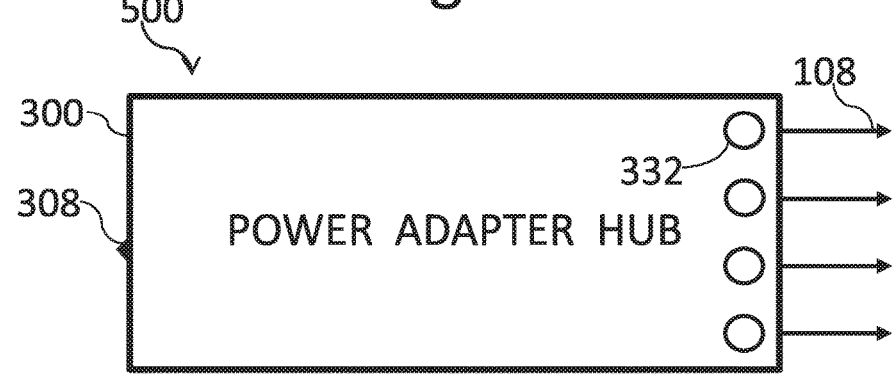
FIG. 3 is a block diagram that schematically illustrates a power supply system, construed in accordance with an embodiment of the present invention.

FIG. 3 shows a block diagrams that schematically illustrates a power supply system 500, in accordance with an embodiment construed in accordance with the present invention. The system comprises power adapter hub 300 and one or more power adapter smart cables as described in more details in our co-pending application U.S. Ser. No. 15/730,869 which is hereby incorporated by reference, and designated as 100a and 100b in that application FIG. 1. A smart cable connects a regular (simple) DC load to a smart output port of the power adapter thereby enabling to benefit from the smart output port capabilities. Yet, as will be appreciated, regular DC loads may be connected also directly to the power adapter output ports, however in such a case there will be only a minimal benefit from the fact that a smart output port has been used. In addition, it should also be clear that smart loads can be connected directly to smart output ports.

The above description has focused on the specific embodiment elements and method steps that are essential for understanding certain features of the disclosed techniques. Detailed structure of the embodiment elements was omitted from the figures and associate description for the sake of simplicity but will be apparent to persons of ordinary skill in the art. The described embodiments and methods shall be referred to as examples, chosen purely for the sake of conceptual clarity. In alternative embodiments, any other suitable configurations and method steps can also be used.

The invention claimed is:

1. A power adapter hub comprising: an AC input port; a power supply circuit coupled to the AC input port for receiving AC power from a power source and having a maximum rated output power; and a plurality of output ports coupled to the power supply circuit for supplying DC power therethrough to external devices, wherein the power supply circuit is configured, upon determining that the total power that is about to be supplied through the plurality of output ports might exceed the maximum rated output power, to modify the DC power associated with at least one of the plurality of output ports, wherein the modified DC power of said at least one output port of said plurality of output ports is set to be greater than zero and less than maximum power delivery capabilities of said respective output port, and wherein no external device is currently connected to said at least one of said plurality of output ports, thereby enabling supply of DC power to an external device when said external device will be connected to said at least one of said output ports to which no external device is currently connected, and wherein the values of the modified DC powers associated with respective output ports, are set to ensure that the power adapter hub supplies power that does not exceed its maximum rated output power, when said external device will be connected to said at least one of said output ports.

2. The power adapter hub according to claim 1, wherein said power supply circuit is further configured and operable to affect the DC power modification, although none of the DC power provided via each of the plurality of output ports, has exceeded its own maximum power delivery capabilities.

3. The power adapter hub of claim 1, wherein setting of the modified DC power is implemented by affecting the DC current without substantially affecting the DC voltage of the DC power being provided via at least one of said plurality of output ports.

4. The power adapter hub of claim 1, wherein at least one of said plurality of output ports is a USB Type C port supporting power delivery.

5. A power adapter hub comprising: an AC input port; a power supply circuit coupled to the AC input port for receiving AC power from a power source and having a maximum rated output power; and a plurality of output ports coupled to the power supply circuit for supplying DC power therethrough to external devices, wherein the power supply circuit is configured, upon determining that the total power that is about to be supplied through the plurality of output ports might exceed the maximum rated output power, to modify the DC power supplied through one or more of the plurality of output ports, wherein the modified DC power is specific to each respective output port, wherein the modified DC power is within a range extending between zero and maximum power delivery capabilities of said respective output port, wherein the DC power of at least one of said plurality of output ports is modified by said power adapter hub based on susceptibility to reduced DC power of an external device connected to an output port of said plurality of output ports, and wherein the values of the modified DC powers, are set to ensure that power supplied by the power adapter hub does not exceed its maximum rated output power.

6. The power hub according to claim 5, wherein information that relates to susceptibility to reduced DC power of the at least one external device is derived from information exchanged between said external device and an output port to which said external device is connected.

7. The power adapter hub according to claim 5, wherein said power supply circuit is further configured and operable to affect DC power modification, although none of said plurality of output ports has exceeded its own maximum power delivery capabilities.

8. The power adapter hub of claim 5, wherein the values of the modified DC powers are set to ensure that when an external device is connected to an unused output port, the power adapter hub delivers power to the newly connected external device and to all other of said plurality of output ports, without exceeding the maximum rated output power of said power adapter hub.

9. The power adapter hub of claim 5, wherein at least one of said plurality of output ports comprising a smart interface, and wherein said smart interface of said at least one of the plurality of output ports complies with one or more characteristics being members of a group that consists of: Universal Serial Bus (USB) Power Delivery (PD), USB 3.x, USB-C, Quick Charge (QC) and Battery Charging (BC).

10. The power hub according to claim 5, wherein information that relates to susceptibility to reduced DC power of the at least one external device is at least partially derived from a difference between requested DC power by said external device and DC power delivered to said external device.

11. A power adapter hub comprising: a power input port; a power supply circuit coupled to the power input port for receiving input power and having a maximum rated output power; a controller; and a plurality of output ports coupled to the power supply circuit for supplying DC power therethrough to external devices,
   wherein at least one of the plurality output ports is characterized by:
   a) its maximum power delivery capabilities,
   b) its allocated power, being a varying maximal amount of power set by the controller for the at least one output port that is allowed to be delivered via said respective at least one output port, and
   c) its delivered power being power that is actually being delivered via said respective at least one output port, wherein the power supply circuit is configured, upon determining that the total power that is about to be supplied through the plurality of output ports might exceed the maximum rated output power, to modify the allocated power of at least one of said plurality of output ports to which no external device is currently connected, to a level higher than zero and lower than said port maximum power delivery capabilities, thereby enabling power delivery through said at least one output port to an external device when said external device will be connected thereto, and wherein value of the allocated power is set to ensure that the power adapter hub supplies power without exceeding its maximum rated output power, when said external device will be connected to said at least one of said output ports.

12. A power adapter hub of claim 11, wherein allocated power of at least one output port is set to zero, in spite that said output port has not exceeded its maximum power delivery capabilities and the power adapter hub has not exceeded its maximum rated output power.

13. The power adapter hub of claim 11, wherein said plurality of output ports are USB Type C ports supporting power delivery.

14. A power adapter hub comprising: an AC input port; a power supply circuit coupled to the AC input port for receiving AC power from a power source and having a maximum rated output power; and a plurality of output ports coupled to the power supply circuit for supplying DC power therethrough to external devices, wherein the power supply circuit is configured, upon determining that the total power that is about to be supplied through the plurality of output ports might exceed the maximum rated output power of the power adapter hub, to modify DC power supplied through at least one of the plurality of output ports to which no external device is currently connected, to a modified DC power being within a range extending between zero and maximum power delivery capabilities of said at least one output port, and wherein in a case where the modified DC power is less than said output port maximum power delivery capabilities, said power adapter hub is further configured to provide information that identifies at least one type of an external device which can be operable when connected to said at least one output port while ensuring that the total power supplied by said power adapter hub does not exceed the maximum rated output power of said power adapter hub once an external device of the at least one type identified is connected to the at least one output port.

* * * * *